United States Patent
Bhattacharyya et al.

(10) Patent No.: US 8,059,538 B1
(45) Date of Patent: Nov. 15, 2011

(54) CMON: AN "ALWAYS-ON" MONITORING PLATFORM FOR HIGH-SPEED LINKS

(75) Inventors: Supratik Bhattacharyya, Mountain View, CA (US); Preetham Mysore, South Plainfield, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 562 days.

(21) Appl. No.: 11/675,876

(22) Filed: Feb. 16, 2007

(51) Int. Cl.
*H04L 12/26* (2006.01)

(52) U.S. Cl. ..................... 370/230.1; 370/235

(58) Field of Classification Search .................. 370/229, 370/230, 230.1, 232, 233, 234, 235, 236, 370/503, 535
See application file for complete search history.

(56) References Cited

U.S. PATENT DOCUMENTS

| | | | | |
|---|---|---|---|---|
| 3,987,248 A * | 10/1976 | Platet et al. | ................... | 370/506 |
| 5,001,711 A * | 3/1991 | Obana et al. | ................... | 370/535 |
| 5,502,573 A * | 3/1996 | Fujinami | .................. | 386/65 |
| 2002/0057861 A1* | 5/2002 | Ge et al. | .................... | 385/16 |
| 2002/0071171 A1* | 6/2002 | Greywall | ....................... | 359/292 |
| 2003/0095574 A1* | 5/2003 | Zimmermann | ............... | 370/503 |

OTHER PUBLICATIONS

Mysore, Preetham, CMON : An "Always-On" Monitoring Platform for High-Speed Links, Thesis drafted Sep. 27, 2006.

* cited by examiner

Primary Examiner — Andrew Lai

(57) ABSTRACT

Systems and methods are discussed for providing a continuous monitoring system for high-speed links. Data packets are passively read in a high-speed environment. Concurrent streams are created to handle the high-speed data packets and to manipulate subsets of data packets in modules for output to various applications or destinations. The modules can include algorithms or filters created for various tasks.

11 Claims, 3 Drawing Sheets

CMON: AN "ALWAYS-ON" MONITORING PLATFORM FOR HIGH-SPEED LINKS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Today, the Internet backbone consists of inter-connected networks of major ISPs, government, academic institutions and large private networks. High bandwidth optical links connect these networks at 'peering' points. Monitoring these high-speed links can give us a wealth of data. Monitoring has applications in traffic accounting, capacity provisioning, anomaly detection, and fault diagnosis.

In today's Internet, viruses, worms and DDOS attacks are commonplace. Intrusion Detection Systems and Antivirus software detect and stop the spread near the leaf nodes of the victim. It is very beneficial to stop this unwanted traffic even before it reaches the victim's network. On a high-speed backbone network, we have the opportunity to see traffic from multiple networks. This means we have more data available to us and can detect the anomaly well before a small-network administrator. Traditionally, changes in network patterns are used to detect such anomalies.

An important requirement for a service provider is to offer higher availability and fault-tolerance. It is well known that when things go wrong in a network, the traffic can change drastically. For example, an unusual sequence of packets might indicate a router mis-configuration. If we could detect these changes well in advance, we can take preventive measures to ensure that service is not interrupted.

Many traffic engineering problems need accurate measurements of metrics like network demand and heavy-hitters over multiple links. Intra-domain routing protocols like ISIS and OSPF need traffic matrices to assign link weights for optimal routing. These traffic accounting requirements are different from network resource usage measurements. Here, we are interested more in per-customer accounting instead of the network resource as a whole. In addition, this information can be useful in detecting changes in the network usage of customers and offering a better service.

Measuring the usage of network resources can be very useful for network management. Common metrics to measure over the link would involve byte and packet counts, change in packet rate and changes in byte rate. This information, augmented with the statistics from the routers, can give a detailed view of the network health.

With the heightened security focus of governments, ISPs will soon have to comply with laws imposed by governmental bodies. Some laws will require that networks be "wire-tap" friendly and easy to monitor.

Most tier-2 and tier-3 ISPs share each other's networks to carry traffic. This sharing is bound by Service Level Agreements (SLA) between the networks. There is no easy way to enforce or check the adherence to these SLAs at all times. However, one way to do it would be to monitor the traffic on the links.

Most of the tasks (queries) mentioned above are continuous, i.e. they keep examining streams of data continuously instead doing a one-time analysis. Network operators would be interested in running such queries at different points in the network.

SUMMARY

The present invention is defined by the claims below. Embodiments of the present invention solve at least the above problems by providing a system and method for, among other things, continuous monitoring of high-speed data links.

Monitoring high-speed networks has applications in traffic accounting, capacity provisioning, anomaly detection and fault diagnosis. The biggest challenge is to scale to high link speeds. An application deployed in a large network has additional requirements like usability, fault tolerance and extensibility. Continuous Monitoring (CMON) is a passive monitoring framework. CMON is lock-free, multi-threaded and easily scales to OC-48 lines. A basic unit of query in CMON is called a 'stream'. A stream includes modules processing a subset of the incoming packet stream. Results generated by these modules can be exported to various media and applications. Streams are defined in a readable configuration file and the definition specifies the filters and modules to apply on the packet stream and the rules to export the result. Based on the configuration, streams are dynamically assembled from the available modules and filters. CMON manages multiple streams running concurrently in the system. CMON is easily extensible because of its modular design.

In a first aspect, a system and method for continuous monitoring of high-speed data links is provided that includes receiving a stream of data packets from a source over the high-speed data links. The data packets are processed according to a speed of a the high-speed data links. The data packets are separated into subsets of the data packets and respectively are provided into concurrent streams. Results are outputted from the concurrent streams respectively to applications. The concurrent streams comprise at least one of a processing module or a filter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
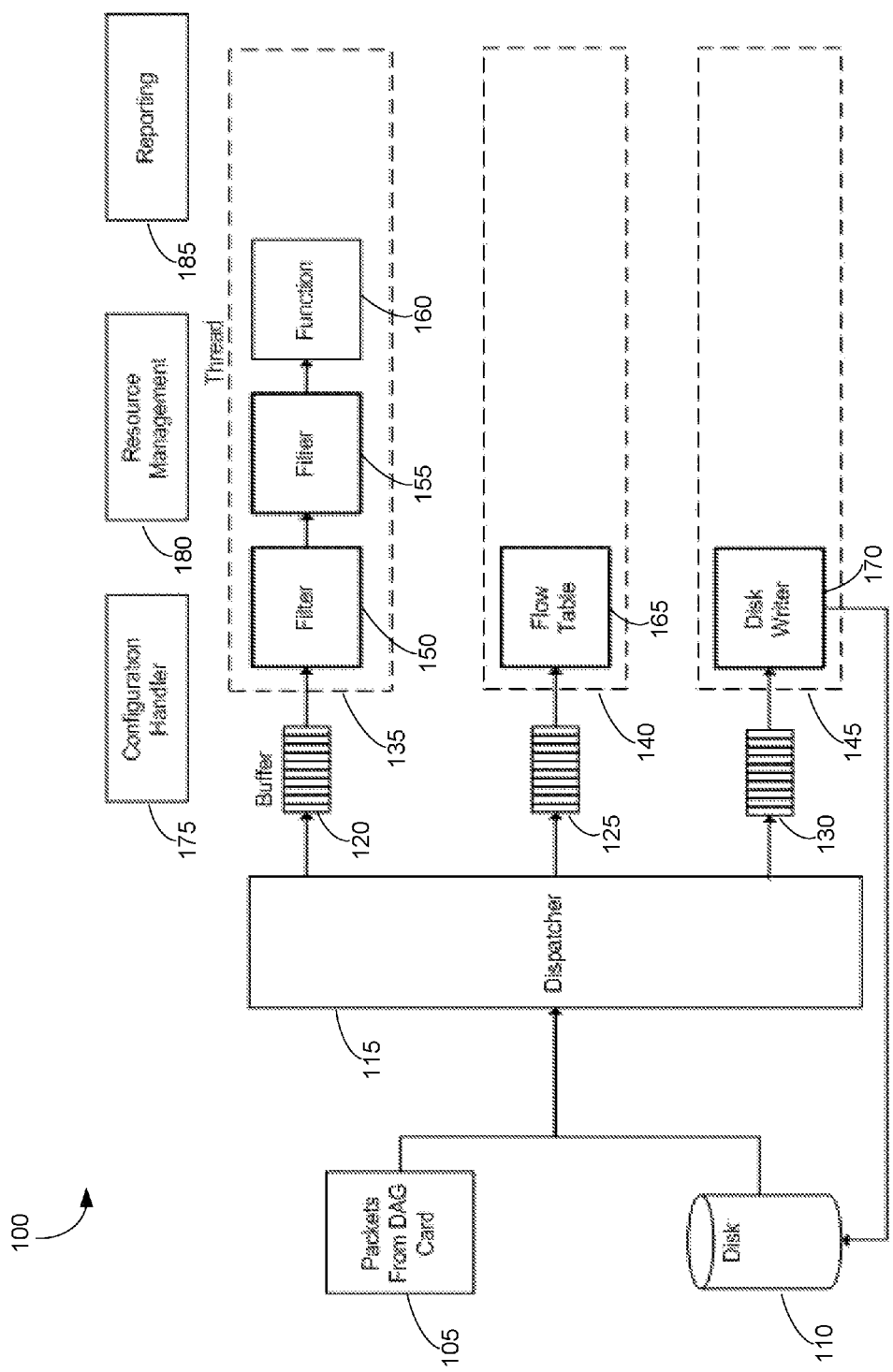
FIG. 1 is a block diagram of an exemplary operating environment suitable for practicing an embodiment of the present invention.

Embodiments of the present invention provide systems and methods for continuous monitoring of high-speed data links. Acronyms and Shorthand Notations Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CMON | Continuous Monitoring |
| CPU | Computing Processing Unit |
| DAG | Data Acquisition Generation |
| DDOS | Distributed Denial of Service |
| GBPS | Gigabits Per Second |
| ISIS | Intermediate Systems to Intermediate Systems |
| ISP | Internet Service Provider |
| OSPF | Open Shortest Path First |
| OC-48 | Optical Carrier-48 |
| SLA | Service Level Agreement |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Continuous Monitoring (CMON)

CMON has an ability to scale to normally loaded OC-48 links. OC-48 links can theoretically carry a maximum bandwidth of 2.8 Gbps. In practice, OC-48 links may not carry their full loaded maximum. The term 'scale to' can mean many things and is relative based on the processing done by modules in CMON. For example, modules with heavy processing on packets from a much smaller network can max out all the resources. It is known in the literature that sampling on packets can adversely effect accuracy of the algorithms/modules. The main idea is to do as much processing as possible without dropping any packets. When the packet rate is too high to process all the packets, CMON has to gracefully degrade. Graceful degradation of CMON can range from dropping packets or stopping some modules.

Users of CMON can be anyone, from the research scientists to the network administrators. The diverse user domain of CMON calls for simpler and intuitive configuration and usage. The system should be flexible enough to allow 'out of the box' implementation of CMON with default functionality. It should also allow CMON to be fine tuned or extended easily when required.

CMON boxes can run continuously for days without any interruption. They are rarely stopped or restarted, and configuration changes are infrequent. Also, CMON can export results to other systems that might not be stable. CMON can be tolerant to the failures in the environment. CMON can report on the health of the system and failures.

CMON is an evolving system. This means that CMON may initially have basic features implemented. As requirements change, new features may be added and it should be easy to implement such extension. Some of the main extensions envisaged are new filters, sampling techniques, processing modules, and different ways of exporting results. Exact details of such extensions are difficult to predict.

CMON uses DAG Cards from the Endace Corporation of Manukau City, New Zealand for capturing packets from a network. For offline processing and debugging purposes, CMON can support reading the packets from packet traces stored on disk. CMON may also be extended to process data captured from sources like Ethernet, wireless networks, etc.

Results obtained after processing modules may be exported to disk for storing or exported to a remote location for further processing. This data may be dynamically sent to different and multiple destinations. For example, data may be sent in a custom format or sent directly to other destinations. CMON should easily and dynamically export to different applications on different destinations.

CMON aims to provide a general framework that has been carefully designed to address requirements. Some of these requirements are orthogonal to each other. For example, scalability requires a highly optimized system, but hand tuning a system can make it less extensible. The design tries to find the right compromise to make the system more useable as described in the following figures.

In FIG. 1, an operating environment 100 is shown with a DAG card 105 and disk 110 acting as sources for data packets that flow to a dispatcher 115. Dispatcher 115 distributes subsets of data packet to buffers 120, 125, and 130 based upon pre-defined criteria. The subsets of data packets are sent to streams 135, 140, and 145. From the criteria, the subsets may be distributed to the streams to aid the processing of the data packets. For example, a computing system may have a fixed processing capability but may be able to handle high-speed data packets if multiple processors are operating concurrently to handle the data packets. The more processors that are operating together, the more data packets can be processed at faster rates. In another criteria, the data packets may be distributed to particular streams for particular functions. In this example, the streams perform different functions. Each packet may be read and the resulting information may be sent to one or more of the streams for further calculations.

Within streams 135, 140, and 145, modules may be found to further process the data packets that pass within the particular stream. The modules can be designed for a variety of functions as described above. For example, in stream 135, filters 150 and 155 and a function 160 are the modules. In stream 140, a flow table 165 is the module. In stream 145, a disk writer 170 is the module. Although operating environment 100 illustrates the particular devices, these devices are merely exemplary and an implementer may provide other devices to accomplish other tasks.

Along with operating environment 100, several global functions are provided to implement an embodiment of the present invention. A configuration handler 175 is provided with a resource management 180 and a reporting manager 185.

Figure 2:
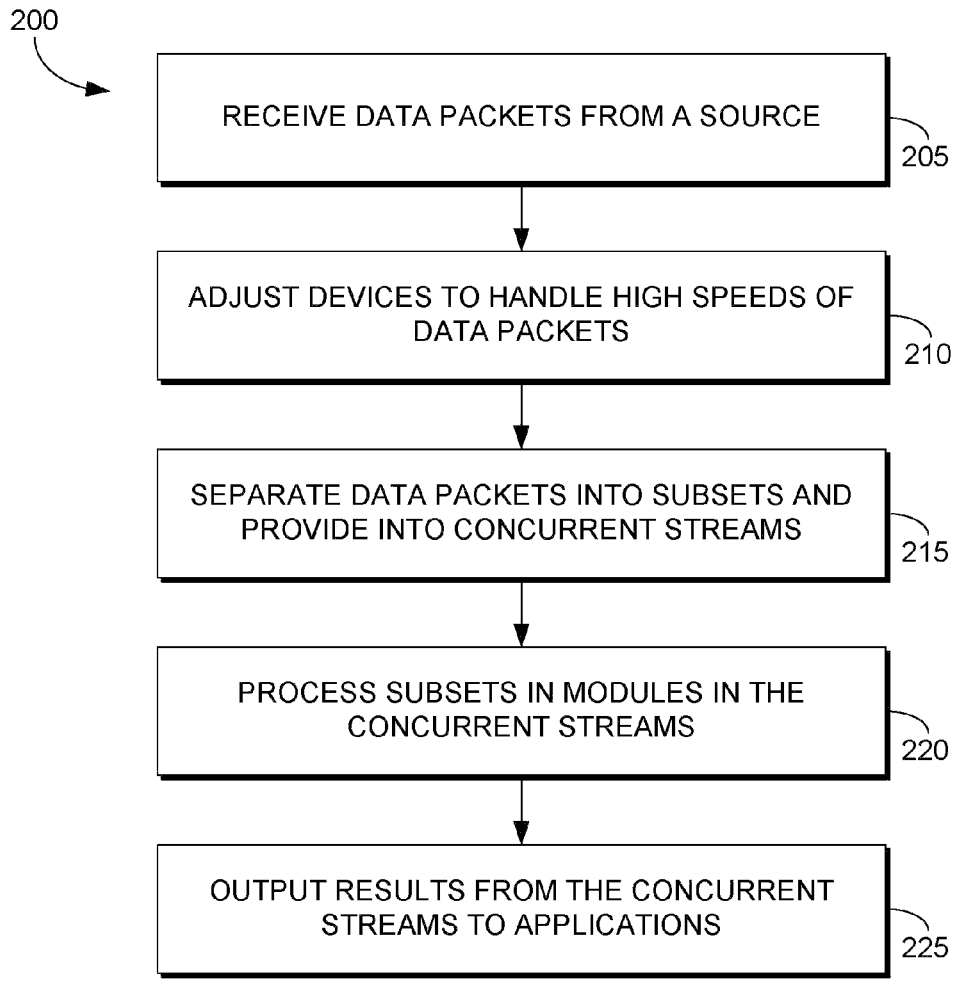
FIG. 2 is a flowchart of an exemplary process operating a CMON when implementing an embodiment of the present invention.

Turning now to FIG. 2, a process for operating a CMON is provided in a method 200. In a step 205, data packets are received from a source like DAG card 105 and disk 110. In a step 210, the devices scale to high speeds in order to handle the data packets at their packet rate. This adjustment may occur in several places including but not limited to dispatcher 115, buffers 120, 125, and 130 and streams 135, 140, and 145. In a step 215, data packets are separated into subsets and provided to concurrent streams 135, 140, and 145. In a step 220, the subsets of data packets in the streams are processed. In a step 225, results are output from the streams to applications.

Figure 3:
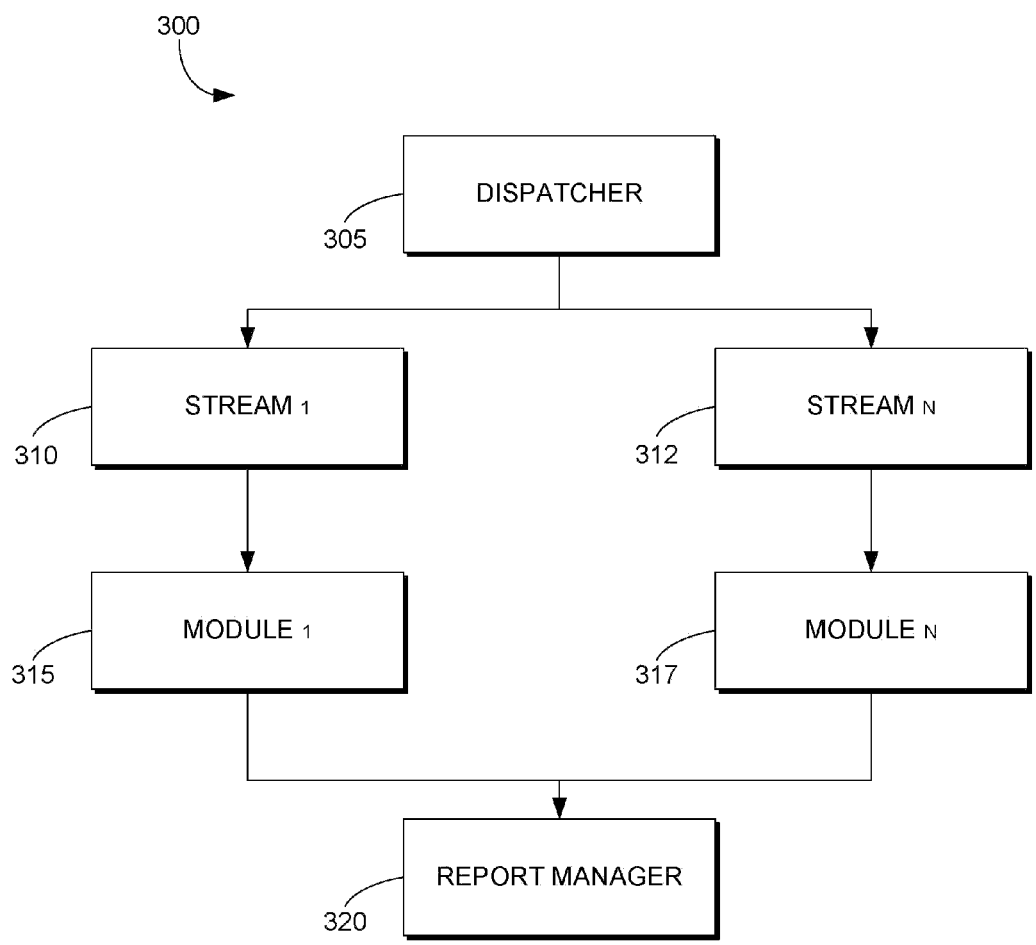
FIG. 3 is a flowchart of another exemplary process for operating a CMON when implementing an embodiment of the present invention.

In FIG. 3, another process for operating a CMON is provided in a method 300. In a step 305, a dispatcher 305 is provided to receive and provide data packets to streams 310 and 312. With streams 310 and 312 respectively, modules 315 and 317 manipulate the data packets to provide results to a report manager 320. Without going into details, method 300 is similar to method 200.

Throughout the disclosure, details are discussed for various embodiments of the present invention. As part of this disclosure, the document entitled "CMON: An "Always-On" Monitoring Platform for High-Speed Links" by Preetham Mysore is hereby incorporated by reference in its entirety.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-readable instructions executable by a computer for causing a computing device to perform a method for continuous monitoring of one or more high-speed data links, comprising:

receiving a set of data packets from a source at a dispatcher, wherein the dispatcher checks for dropped packets, wherein the dispatcher requests a buffer from a pool manager, wherein the dispatcher copies the set of data packets to the buffer, and wherein the source is a data acquisition generation card or a disk;

sending from the dispatcher the set of data packets to the one or more high-speed data links;

processing the data packets at a speed of the high-speed data links, wherein processing the data packets comprises separating the data packets into one or more subsets of the data packets and respectively providing into one or more concurrent streams, wherein the dispatcher controls the one or more concurrent streams, wherein each stream of the one or more concurrent streams comprise respectively at least one of a processing module and a filter, and wherein each stream is defined in a configuration file; and outputting one or more results from the one or more concurrent streams respectively to one or more applications, wherein the at least one of the processing module and the filter is connected in a chain sequence in each stream when additional modules or filters exist;

wherein the processing module or the filter has a conditional expression that when satisfied a data packet is sent to a next processing module or a next filter in the chain sequence if the next processing module or the filter exists.

2. The media of claim 1, wherein processing the data packets comprises scaling the at least one of the processing module and the filter to process the data packets at data speeds of 2.5 gigabytes per second or more without dropping a data packet.

3. The media of claim 2, further comprising adding another processing module or another filter to process more data packets.

4. The media of claim 1, wherein the one or more high-speed data links are selected from a group including a logical connection between two or more points and a physical connection between another two or more points.

5. A system, having a processor and a memory, for continuous monitoring of high-speed data links, comprising:

(a) a dispatcher for receiving a packet in a packet network from a source and providing it to at least one stream, wherein the dispatcher configures the system and controls an allocation of packets to the at least one stream, wherein the dispatcher checks for dropped packets, wherein the dispatcher requests a buffer from a pool manager, wherein the dispatcher copies the set of data packets to the buffer, and wherein the source is a data acquisition generation card or a disk;

(b) the at least one stream for processing the packet according to a packet rate, and wherein the at least one stream is defined in a configuration file;

(c) at least one module associated respectively with the at least one stream to manipulate the packet to obtain a result, wherein for a particular stream a module has a conditional expression that when satisfied the packet is sent to a next module in a chain sequence in the particular stream if the next module exists; and (d) a report manager for outputting the result to a destination.

6. The system of claim 5, further comprising repeating steps (a)-(d) with one or more packets.

7. The system of claim 6, further comprising the dispatcher, a second stream, and at least one second module operable together in accordance with the steps (a)-(c) wherein the second stream performs a first function similar to the at least one stream and the at least one second module performs a second function similar to the at least one module.

8. A computer system having a processor and a memory, the computer system operable to execute a method for continuous monitoring of one or more high-speed data links, comprising:

receiving a set of data packets from a source at a dispatcher, wherein the dispatcher checks for dropped packets, wherein the dispatcher requests a buffer from a pool manager, wherein the dispatcher copies the set of data packets to the buffer, and wherein the source is a data acquisition generation card or a disk;

sending from the dispatcher the set of data packets the one or more high-speed data links;

processing the data packets at a speed of the high-speed data links, wherein processing the data packets comprises separating the data packets into one or more subsets of the data packets and respectively providing into one or more concurrent streams, wherein the dispatcher controls the one or more concurrent streams, wherein each stream of the one or more concurrent streams comprise respectively at least one of a processing module and a filter, and wherein each stream is defined in a configuration file; and outputting one or more results from the one or more concurrent streams respectively to one or more applications, wherein the at least one of the processing module and the filter is connected in a chain sequence in each stream when additional modules or filters exist;

wherein the processing module or the filter has a conditional expression that when satisfied a data packet is sent to a next processing module or a next filter in the chain sequence if the next processing module or the filter exists.

9. The system of claim 8, wherein processing the data packets comprises scaling the at least one of the processing module and the filter to process the data packets at data speeds of 2.5 gigabytes per second or more without dropping a data packet.

10. The system of claim 9, further comprising adding another processing module or another filter to process more data packets.

11. The system of claim 8, wherein the one or more high-speed data links are selected from a group including a logical connection between two or more points and a physical connection between another two or more points.

* * * * *